US012105821B2

(12) United States Patent
Duraisamy et al.

(10) Patent No.: US 12,105,821 B2
(45) Date of Patent: Oct. 1, 2024

(54) INSTANT CARRIER ONBOARDING FOR TRANSPORTATION DATA AGGREGATOR PLATFORM

(71) Applicant: TruckerCloud Holdings LLC, Atlanta, GA (US)

(72) Inventors: Jayakumar Duraisamy, Alpharetta, GA (US); Lalithadevi Venkataramani, Johns Creek, GA (US)

(73) Assignee: TruckerCloud Holdings LLC, Atlanta, GA (US)

( * ) Notice: Subject to any disclaimer, the term of this patent is extended or adjusted under 35 U.S.C. 154(b) by 213 days.

(21) Appl. No.: 17/509,851

(22) Filed: Oct. 25, 2021

(65) Prior Publication Data

US 2023/0126369 A1  Apr. 27, 2023

(51) Int. Cl.
| | |
|---|---|
| G06F 21/62 | (2013.01) |
| G06F 9/54 | (2006.01) |
| G06Q 10/08 | (2024.01) |
| G06Q 50/40 | (2024.01) |
| H04L 9/40 | (2022.01) |

(52) U.S. Cl.
CPC .......... G06F 21/6218 (2013.01); G06F 9/547 (2013.01); G06Q 10/08 (2013.01); G06Q 50/40 (2024.01); H04L 63/083 (2013.01)

(58) Field of Classification Search
CPC ...... G06F 21/44; G06F 21/6218; G06F 9/547; G06Q 10/08; G06Q 50/30; H04L 63/08; H04L 63/083
See application file for complete search history.

(56) References Cited

U.S. PATENT DOCUMENTS

2020/0219337 A1* 7/2020 Kwak ................ G06F 21/6272

* cited by examiner

*Primary Examiner* — Olugbenga O Idowu
(74) *Attorney, Agent, or Firm* — Arnall Golden Gregory LLP

(57) ABSTRACT

A transportation data aggregator platform ("TDAP") receives, from a carrier computing device, a selection of one or more electronic logging device ("ELD") provider systems associated with ELDs of vehicles of a carrier. The TDAP, for each of the one or more selected ELD provider systems, (1) displays, on the computing device of the carrier computing device, a request for credentials associated with the selected ELD provider system, (2) receives, via the carrier computing device, an input comprising the credentials, (3) communicates, to the ELD provider system, the credentials, and (4) receives, from the ELD provider system, a response confirming a validity of the communicated credentials. The TDAP, in response to receiving the response for each of the one or more selected ELD provider systems, generates a letter of authorization ("LOA") and accesses ELD data logged by ELDs of the carrier from the one or more selected ELD provider systems.

23 Claims, 4 Drawing Sheets

INSTANT CARRIER ONBOARDING FOR TRANSPORTATION DATA AGGREGATOR PLATFORM

TECHNICAL FIELD

This disclosure generally relates to transportation data aggregator platforms. More specifically, but not by way of limitation, this disclosure relates to transportation data aggregator platforms for accessing electronic logging device data of carrier vehicles.

BACKGROUND

Transportation logistics systems provide clients—such as shippers, brokers, factors, freight logistics providers, technology partners, etc.—with vehicle-specific data of a shipping network associated with one or more carriers via a transportation data aggregator platform ("TDAP"). The vehicle-specific data (e.g. hours of service, vehicle engine data, session reports, and driver visibility) is logged in the TDAP and is collected, at least in part, by electronic logging devices ("ELDs") located in or mounted to trucks and other shipping vehicles of the carriers. TDAPs interface with ELD service providers to receive vehicle-specific data logged by ELDs.

The process of providing a client (e.g., shipper, broker, factor, freight logistics provider, technology partner) access to a TDAP and authorizing the client to access ELD data of or one or more carriers can be cumbersome and time consuming. The client must be registered to access the TDAP and authorized to access the carrier's ELD data. The carrier's system and/or its ELD service provider's system must be connected to the TDAP for exchange of ELD data. An account must be established for the carrier within the TDAP for storage and management of the carrier's ELD data. The carrier must authorize the TDAP provider to provide access to the carrier's ELD data to the client on the carrier's behalf.

Establishing a carrier account within a TDAP is referred to as on-boarding the carrier. In a conventional onboarding process, a TDAP operator receives, from a carrier, the carrier's ELD service provider credentials for one or more ELD service providers associated with the carrier. The TDAP operator then individually submits the credentials to the applicable ELD service providers. Upon verification and authentication of the credentials, the TDAP can be configured to access and/or receive ELD device data from the ELD service provider(s) and/or directly from the ELDs. In some instances, incorrect credentials are provided by carriers and the onboarding process fails. As a result, the TDAP operator must request the correct credentials from the carrier, which results in a substantial delay in onboarding the carrier. In some cases, onboarding delays can extend 24 hours or longer.

SUMMARY

Certain embodiments involve onboarding a carrier computing device into a transportation data aggregator platform to enable sharing of electronic logging device (ELD) information with a client system (e.g. operated by a client). For example, the TDAP receives, from a computing device of a carrier, a selection of one or more ELD provider platforms associated with ELDs of vehicles of the carrier. The TDAP, for each of the one or more selected ELD provider platforms, (1) displays, on the carrier computing device, a request for credentials associated with the selected ELD provider platform, (2) receives, via the carrier computing device, an input comprising the credentials, (3) communicates, to the ELD provider platform, the credentials, and (4) receives, from the ELD provider platform, a response confirming a validity of the communicated credentials. The TDAP, in response to receiving the response for each of the one or more selected ELD provider platforms, generates a letter of authorization (LOA) authorizing the TDAP to share ELD data of the carrier with the client system, accesses ELD data logged by ELDs of the carrier computing device from the one or more selected ELD provider platforms, and shares the accessed ELD data with the requesting client or otherwise makes the accessed ELD data available for access by the requesting client system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
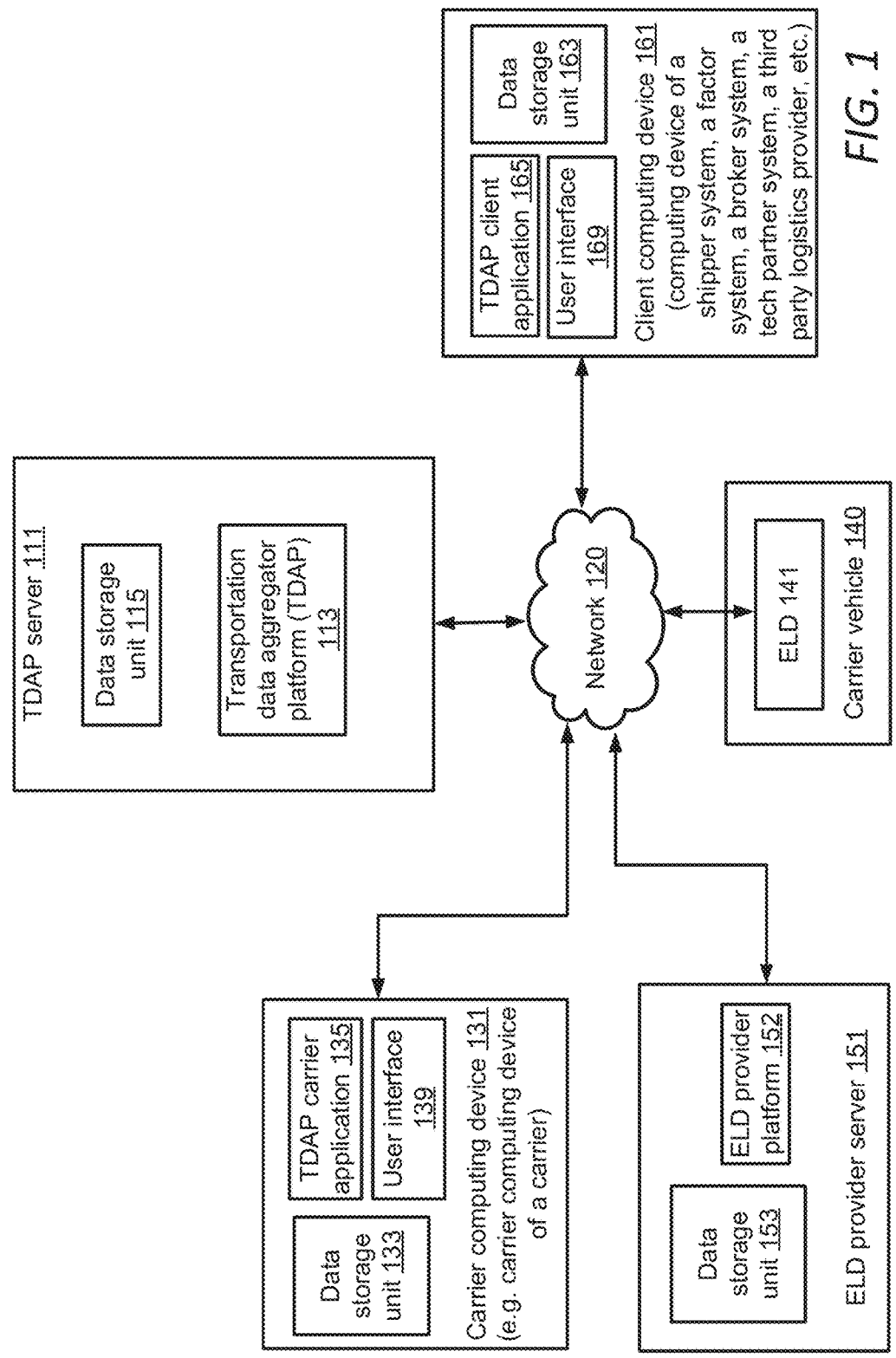
FIG. 1 depicts an example of a computing environment for onboarding a carrier into a transportation data aggregator platform to enable sharing of electronic logging device information with a client, according to certain embodiments described in the present disclosure.

The present disclosure involves a TDAP that allows for more conveniently onboarding a carrier into a transportation data aggregator platform to enable sharing of ELD data of the carrier with a client of the TDAP. As explained above, conventional transportation logistics computing systems have a TDAP which can request and receive ELD data from individual ELD provider systems using credentials provided by carriers. However, the entry of carrier credentials by a TDAP operator at a time after enrollment of carrier computing devices results in users degrades the functionality and deployability of the TDAP in cases where a carrier provides incorrect credentials, resulting in the TDAP not being able to access ELD data from ELD provider platforms. Certain embodiments described herein can avoid one or more of these problems by, for example, incorporating a loop wizard that receives and live tests the carrier's ELD platform credentials for one or more ELD provider platforms during an onboarding of the carrier with the TDAP. These embodiments can improve the functionality of the TDAP by reducing an occurrence of inaccessibility of ELD data due to incorrect credentials through performance of the live test of credentials during the onboarding. The embodiments can also improve the functionality of the TDAP by reducing burdensome user interface by the TDAP operator by no longer requiring a TDAP operator to enter credentials or, if credentials are incorrect, no longer requiring the TDAP operator to request new credentials from the carrier device for the TDAP operator to subsequently enter such credentials.

The following non-limiting example is provided to introduce certain embodiments. In this example, in response to an input by a requesting client (e.g. an input by an operator of a client computing device of the client), the TDAP transmits a request to or otherwise communicates with a verification system, which is separate from the TDAP, to verify a requested carrier computing device using an identifier and, if the TDAP receives a confirmation from the verification system that the identifier is valid, the TDAP determines whether the carrier computing device has an account with the TDAP. If the carrier computing device does not have an account with the TDAP, the TDAP creates a new carrier computing device identifier and sends an invitation to the carrier computing device to create a new TDAP account and share ELD data with the requesting client system. If the carrier computing device has an existing account with the TDAP, the TDAP determines whether the carrier computing device has an associated factor. If the TDAP determines that the carrier computing device has an associated factor, the TDAP determines whether the client is also a factor and, if the client is also a factor, the TDAP displays a warning message and contacts the carrier computing device. In another example, if either (A) the carrier computing device is not associated with a factor client or (B) the carrier computing device is associated with the factor client but the carrier computing device is not a factor client, the TDAP displays ELD providers associated with the carrier computing device to the client. The TDAP sends an invitation to the existing carrier computing device account including a request to share ELD data with the client.

In certain embodiments, the TDAP receives an acceptance of the invitation to share ELD data with the requesting client of the TDAP and creates a new account for the carrier and/or configures the carrier computing device account to request approval of sharing of ELD data of carrier vehicles from ELD provider platforms, as applicable. Creating the new account for the carrier could involve prepopulating a carrier account creation page with carrier information (e.g. as received from the verification system in response to submitting the verification identifier of the carrier) and receiving an approval of the carrier information. The TDAP onboards the carrier to share ELD data with the requesting client, whether in a new carrier account or an existing carrier account, the TDAP. For example, the TDAP displays ELD provider systems associated with a carrier account as well as a set of all ELD provider systems known to the TDAP (e.g. for accounts of all carriers including the requested carrier). The TDAP receives a selection of a subset of the set of all ELD provider platforms. The TDAP executes a loop wizard that, successively, for each of the selected ELD provider platforms: (1) displays ELD data sharing options for the selected ELD provider platform, (2) receives a selection of ELD data sharing options, (3) receives credentials, (4) live tests an application programming interface ("API") of the selected ELD provider platform using the credentials, and (5) determines whether the credentials are valid using the API live test. In response to a successful API live test of credentials for all selected ELD provider platforms, the TDAP generates a letter of authorization ("LOA") that enables sharing, by the TDAP with the requesting client, of carrier ELD data received from each of the selected ELD provider platforms.

Certain embodiments provide improvements to computing systems by lessening a burden of navigation of user interfaces. Examples of burdensome user interface navigation include entering, by an operator of a TDAP, carrier ELD provider platform credentials to enable access by the TDAP to carrier ELD data on one or more ELD provider platforms. Further burdensome user interface navigation includes, in cases where credentials are determined not to be valid, requesting and/or receiving updated credentials from the carrier and subsequently entering the updated credentials. Improvements that reduce this burdensome user interface navigation can be effected by integrating a reception of and live API test of credentials for accessing ELD provider platform data during an onboarding of a carrier. Integrating the gathering of and live testing of credentials into the carrier onboarding process in this manner improves the functionality of the user interface by, for example, reducing the amount of scrolling or other navigation required by the user interface of computing devices of the TDAP. These techniques, therefore, decrease an amount of time or effort that the TDAP (spends on collecting valid credentials, especially in cases where carrier's provide incorrect credentials or operators record and/or enter credentials incorrectly.

Example of a Computing Environment for Onboarding a Carrier Computing Device to a TDAP to Enable Sharing of ELD Data from One or More ELD Provider Systems with a Client System Referring now to the drawings, FIG. 1 depicts an example of a computing environment 100 for selecting and onboarding a carrier to a TDAP to enable sharing of ELD data with a client of the TDAP (e.g. a shipper, a broker, a factor, or a technology partner), in accordance with certain embodiments. In this example, the computing environment 100 includes a TDAP 113, a carrier computing device 131 associated with the carrier, one or more carrier vehicles 140 that are associated with the carrier that each include an ELD 141, at least one ELD provider platform 152, and a client computing device 161 associated with the client. A TDAP 113 can share data associated with one or more carriers with one or more clients for which such data is important or valuable. Particularly, in certain examples, the TDAP 113 receives, from one or more ELD provider platforms 152 associated with ELDs 141 of carrier vehicles 140 of a carrier, data logged by the ELDs 141 and shares the data with a client.

In the example depicted in FIG. 1, A TDAP server 111 includes a data storage unit 115 and a TDAP 113. The TDAP 113 is a service that shares ELD 141 data of carrier vehicles 140 with clients. For example, the TDAP 113 shares ELD 141 data of one or more carrier vehicles 140 of a carrier system associated with the carrier computing device 131.

The TDAP server 111 supports the TDAP 113. In some embodiments, the TDAP server 111 provides content, including but not limited to html documents, images, style sheets, and scripts, (1) to a carrier computing device 131 accessed through the TDAP carrier application 135 or a web browser of the carrier computing device 131, (2) to a client computing device 161 accessed through the TDAP client application 165 or a web browser of the client computing device 161, and/or (3) to an ELD provider platform 152 accessed via an application of or web browser of the ELD provider platform 152.

In certain embodiments, a client computing device 161 interacts with the TDAP 113 via a web browser-based TDAP client application 165. For example, the TDAP client application 165 executes in a website of the TDAP accessed through a web browser of the client computing device 161. In certain embodiments, a carrier computing device 131 interacts with the TDAP 113 via a web browser-based TDAP carrier application 135. For example, the TDAP carrier application 135 executes in a website of the TDAP accessed through a web browser of the carrier computing device 131. However, in some embodiments, the TDAP 113 provides, for download by the client computing device 161, the TDAP client application 165. In some embodiments, the TDAP 113 provides, for download by the carrier computing device 131, the TDAP carrier application 135. The TDAP 113 provides, via the network 120 to a client computing device 161 (e.g. to the TDAP client application 165), ELD 141 data of one or more carrier vehicles 140 from one or more ELD provider platforms 152. In certain embodiments, during an onboarding of a carrier computing device 131, the TDAP 113 live tests an application programming interface (API) of an ELD provider platform 152 using credentials provided by an operator of the carrier computing device 131 to determine whether or not the credentials are valid and determine whether one or more data types selected by the operator of the client computing device 131 are available for sharing by the ELD provider platform 152. The TDAP 113 receives, via the network 120 and for each ELD 141 of a carrier computing device 131, data logged by the ELD 141 from an ELD provider platform 152 associated with the ELD 141.

In some instances, the TDAP 113 performs one or more functions described herein as being performed by the TDAP client application 165 and/or the TDAP carrier application 135. In some instances, one or more of the TDAP client application 165 or the TDAP carrier application 135 performs one or more functions described herein as being performed by the TDAP 113.

The data storage unit 115 could include a local or remote data storage structure accessible to the TDAP 113 suitable for storing information. A data storage unit can store relevant data as one or more databases, one or more matrices, computer code, etc. The data storage unit 115 stores ELD 141 data of one or more carrier vehicles 140 of a carrier computing device 131 from one or more ELD provider platforms 152. In certain embodiments, the data storage unit 115 comprises a database that stores received ELD 141 from carrier vehicles 140. The database comprises a data lake that stores raw ELD 141 data in an unstructured form as it is received from ELDs 141. In certain embodiments, the TDAP 113 extracts particular ELD 141 data from the data lake by applying an index and query-based lookup to the data lake. In certain embodiments, the data lake is supported by a system of distributed nodes. In certain embodiments, the data lake comprises a document database that can continuously and/or periodically receive ELD 141 data from ELD provider platforms 152. Using a data lake for unstructured storage of the ELD 141 data provides an ability to store a larger volume of data, which can improve the scope of ELD 141 data that can be provided by the TDAP 113 without reducing performance of the TDAP 113. In other embodiments, the database stores received ELD 141 data in a structured manner (e.g. in a table, a matrix, or other structured format).

The carrier computing device 131 could be associated with a carrier, for example, a shipping company, a freight company, a supply company, a transportation company, or other company or entity that has one or more carrier vehicles 140 which log data via ELDs 141 installed in the carrier vehicles 140. For example, a shipping company has a fleet of delivery trucks which log data via ELDs 141. In certain embodiments carrier computing device 131 accesses the TDAP 113 using a web-browser-based TDAP carrier application 135 and an operator of the carrier computing device 131 can access the TDAP 113 via a web browser of the carrier computing device 131. In other embodiments, the TDAP carrier application 135 is a stand-alone application and is downloaded onto the carrier computing device 131. The carrier computing device 131 communicates with the TDAP 113 via the network 120.

In certain examples, the carrier computing device 131 receives a request to onboard the carrier to the TDAP 113. Onboarding the carrier could involve the carrier registering, using the carrier computing device 131, for an account with the TDAP 113. Onboarding the carrier could also involve, if the carrier already has an account with the TDAP 113, associating the carrier with an additional client that is requesting ELD 141 data. Onboarding could also involve providing, by the carrier computing device 131, access to ELD 141 data by entering credentials of the carrier associated with ELD provider platforms 152 to enable the TDAP 113 to access the ELD 141 data via the ELD provider platforms 152.

The user interface 139 enables an operator of the carrier computing device 131 to interact with the TDAP 113 via the TDAP carrier application 135. The user interface 139 could be a display device (e.g. a display monitor), a touchscreen interface, or other user interface 139 that can display one or more outputs of the TDAP carrier application 135 and receive one or more inputs of the operator of the carrier computing device 131. In certain examples, the TDAP carrier application 135 displays, via a user interface 139 of the carrier computing device, a request for credentials ELD provider platform 152 to access an ELD provider platform 152 and receives, via one or more inputs via the user interface 139, the requested credentials. In certain examples, the TDAP carrier application 135 displays, via a user interface 139 of the carrier computing device, a request for one or more types of ELD 141 data to share and receives, via one or more inputs via the user interface 139 to select one or more data types to share. For example, ELD provider platforms 152 enable sharing of a set of types of data (e.g. location data, one or more trip times, velocity data, etc.) and the operator of the carrier computing device 131 selects, via the user interface 139, specific types of data (e.g. the operator selects for sharing of location data only).

In certain embodiments, the carrier computing device 131 is associated with a carrier that includes one or more carrier vehicles 140, each carrier vehicle 140 including an ELD 141. For example, the carrier has a fleet of trucks, vans, and/or other carrier vehicles 140.

The electronic logging device (ELD) 141 is a device that logs data of a carrier vehicle 140. The logged data can include location data (e.g. location coordinates), a location history, velocity data (e.g. a speed in miles per hour or kilometers per hour), accelerometer data (e.g. an orientation or alignment of the ELD 141), times of operation, session reports, engine data of the carrier vehicle 140, an accumulated time of operation or hours of service, idle times, an accumulated idle time, times of transit, an accumulated transit time, navigation system data, camera device data (e.g. from a dashboard camera), sound data (e.g. from a microphone device), or other data that can be determined directly by the ELD 141 or received by the ELD 141 from a computing device communicatively coupled to the ELD 141 (e.g. a camera feed received from a dashboard camera device that communicates wirelessly with the ELD 141). In certain instances, the ELD 141 comprises a specific device that is integrated into the carrier vehicle 140. In some instances, a mobile computing device (e.g. a smartphone) of an operator of the carrier vehicle 140 comprises an ELD 141 application downloaded from the ELD provider platform 152 that causes the mobile computing device to operate as an ELD 141. The ELD 141 communicates logged data to an ELD provider platform 152 via the network 120 continuously, periodically, or upon request of the carrier vehicle 140 operator, a carrier computing device 131 operator, and/or the TDAP 113. The data logged by ELDs 141 and shared, via ELD provider platform 152, with the TDAP 113 enables clients to track hours of service, carrier vehicle 140 engine data, session reports, driver visibility, and other useful data provided by ELDs 141.

An ELD provider platform 152 shares data logged by ELDs 141 with the TDAP 113 via the network 120. The ELD provider platform 152 communicates with one or more ELDs 141 associated with one or more respective carrier vehicles 140 of one or more carrier computing devices 131 to receive data logged by respective ELDs 141. In certain embodiments, an ELD server 151 supports the ELD provider platform 152 and includes a data storage unit 153. In some embodiments, a carrier system includes a carrier vehicles 140 that include ELDs 141 associated with two or more ELD provider platforms 152. In certain embodiments, ELD provider platforms 152 provide ELDs 141 to carrier computing devices 131.

In some embodiments, the ELD server 151 provides content, including but not limited to HTML, documents, images, style sheets, and scripts via the network 120 (1) to an ELD 141, (2) to a client computing device 161 accessed through the TDAP client application 165 (e.g. executing in a web browser of the client computing device 161 or as a stand-alone application of the client computing device 161), and/or (3) to a carrier computing device 131 accessed through the TDAP carrier application 135 (e.g. as an application executing in a web browser of the carrier computing device 131 or as a stand-alone application of the carrier computing device 131).

The ELD provider platform 152 could receive, via the network 120 from one or more ELDs 141 installed and/or otherwise located in or on one or more carrier vehicles 140, data logged by the respective ELDs 141. In certain examples, an operator of an ELD 141 (e.g. a carrier system operator or an operator of the carrier vehicle 140) can download an application onto the ELD 141 that communicates with the ELD provider platform via the network 120 or otherwise configures the ELD 141 to communicate with the ELD provider platform 152 via the network 120. In some embodiments, the ELD provider platform 152 periodically requests data from an ELD 141 via the network 120. The ELD provider platform 152 could receive, from the TDAP 113, credentials provided by a carrier computing device 131 and, in response to validating the credentials, the ELD provider platform 152 could transmit logged data received from ELDs 141 associated with the carrier computing device 131. ELD provider platform 152. In certain embodiments, the ELD provider platform 152 receives a request for a specific type of ELD 141 data (of a set of data types) and transmits only the selected type of ELD 141 data to the TDAP 113 in response to validating the credentials.

The data storage unit 153 could include a local or remote data storage structure accessible to the ELD provider platform 152 suitable for storing information. A data storage unit 153 can store relevant data as one or more databases, one or more matrices, computer code, etc. In some embodiments, the data storage unit 153 stores credentials for one or more carrier computing devices 131 having ELDs 141 associated with the ELD provider platform 152.

The client computing device 161 is associated with the client of the TDAP 113 that is requesting access to ELD 141 data of the carrier. For example, a client system could be a shipper system, a factor client, a broker system, a technology partner system, a third party logistics (3PL) provider, or other client that interacts with the TDAP 113 to receive or otherwise access ELD 141 data as authorized by the carrier computing device 131.

An example shipper system is a computer system operated by a shipper. The shipper system interacts with the TDAP 113 to access ELD 141 data to monitor relevant ELD 141 data. The relevant ELD 141 data can include ELD 141 data related to a particular shipment. The relevant ELD 141 data can include ELD 141 data related to metrics describing a fleet of carrier vehicles 140 associated with the shipper system, for example, metrics describing performance of the carrier vehicles 140.

An example factor client is a computing system operated by a factor, which is a financing party. The factor uses the factor client to communicate with the TDAP 113 to access ELD 141 data of carrier vehicles 140 of a carrier system. In certain examples, the factor and the carrier system could have an arrangement that involves using shipment material as collateral to the factor in exchange for the factor extending a loan to the carrier. In this example, the factor retrieves ELD 141 of the carrier vehicles 140 of the carrier system to determine one or more financing terms and/or to monitor a status of the shipment which was collateral for credit extended.

An example broker system is a computing system operated by a broker, which matches shippers with carriers. The broker accesses the TDAP 113 via the broker system to retrieve relevant ELD 141 data of carrier vehicles 140 of a carrier system. The relevant ELD 141 data assists the broker in looking for a best price, best or fastest delivery time, or other metric provided in or derived from the relevant ELD 141 data accessed from TDAP 113. In certain embodiments, the TDAP 113 limits a broker system's access to ELD 141 data to a time period corresponding to when a shipment associated with the ELD 141 is in progress.

An example 3PL provider provides services including one or more of transportation services, warehousing services, processing services, packaging services, or other services.

An example technology partner system could be a loadboard that receives location ELD 141 data and makes the location data available to brokers so that carrier vehicles 140 can be matched to brokers. In this example, brokers may look at the loadboard and decide to which carrier to offer services, based on the location data of carrier vehicles 140. In certain embodiments, a technology partner system (e.g. the loadboard) may access hours of service ELD 141 data, which may effect an availability of carrier vehicles 140 to brokers. For example, government regulations may specify a maximum hours of service per time period (e.g. a number of hours per day a number of days/hours per week) and a broker is able to view which carrier vehicles 140 have exceeded the maximum hours of service per time period by accessing the hours of service ELD 141 data via a platform of the tech partner, which receives the hours of service data from the TDAP 113.

In certain embodiments, a client computing device 161 is associated with the client and is used by an operator of the client to access the TDAP 113 via the network 120. The client computing device 161 includes a data storage unit 163, a TDAP application 165, and a user interface 169. In certain embodiments, the TDAP application 165 is a web-browser-based application that executes in a web browser of the client computing device 161 and communicates with the TDAP 113. For example, the client computing device 161 accesses a web site of the TDAP 113 via the web browser application and the TDAP application 165 executes in the web browser application. In other embodiments, an operator of the client computing device 161 downloads, from the TDAP client application 165 as a stand-alone application on the client computing device 161 and the stand-alone TDAP client application 165 communicates with the TDAP 113 via the network 120. The data storage unit 163 could include a local or remote data storage structure accessible to the client computing device 161 suitable for storing information. The data storage unit 163 stores ELD 141 data associated with carrier vehicles 140 of one or more carrier systems, where the ELD 141 data, logged by ELDs 141 associated with carrier vehicles 140 of the respective carrier systems, is received by the client computing device 161 from the TDAP 113. In certain examples, the TDAP client application 165 communicates, via the network 120, with the TDAP 113 and receives ELD 141 data for ELDs 141 associated with the carrier computing device 131. In certain examples, the TDAP client application 165 displays the received ELD 141 data via the user interface 169 and/or stores the received ELD 141 data in the data storage unit 163. In certain examples, an operator of the client computing device 161 client accesses the TDAP client application 165 via the user interface 119 (e.g. by accessing TDAP client application 165 via the web browser, or, in other embodiments, selecting a stand-alone TDAP client application 165 that was downloaded on the client computing device 161), selects a carrier system (e.g. a carrier system associated with the carrier computing device 131) and requests ELD 141 data for ELDs 141 associated with the carrier system from the TDAP 113.

The user interface 169 enables an operator of the carrier computing device 131 to interact with the TDAP client application 165. The user interface 169 could be a display device (e.g. a display monitor), a touchscreen interface, or other user interface 169 that can display one or more outputs of the TDAP client application 165 and receive one or more inputs of the operator of the client computing device 161. In some embodiments, the operator of the client computing device 161 inputs a carrier system identifier to the TDAP client application 165 via the user interface 169. The TDAP client application 165 displays, via the user interface 169, information for the carrier computing device 131 associated with the identifier. The, TDAP client application 165 provides for display via the user interface 169, different ELD provider platforms 152 associated with ELDs 141 of carrier vehicles 141 of the carrier system. The TDAP client application 165 executes, via the user interface 169, a loop wizard that enables an input, for each ELD provider platform 152, a set of credentials and a selection of a subset of types of data (e.g. location data, one or more trip times, velocity data, etc.) via one or more inputs to the user interface 169. In some embodiments, the TDAP client application 165 provides for display via the user interface 169, a result of a live API test, with the ELD provider platform 152, of the entered credentials and selected subset of types of ELD 141 data. In certain examples, the TDAP client application 165 displays, via a user interface 169 of the client computing device 161, ELD 141 data received from the TDAP 113 in accordance with the selected subset of types of ELD 141 data.

One or more of the TDAP 113 (and/or supporting TDAP server 111), the carrier computing device 131, the ELD 141, the ELD provider platform 152 (and/or supporting ELD server 151), and the client computing device 161 include a device having a communication module capable of transmitting and receiving data over one or more networks 120. For instance, one or more of the TDAP 113, the carrier computing device 131, the ELD 141, the ELD provider platform 152, and the client computing device 161 include a server, a desktop computer, a laptop computer, a tablet computer, a television with one or more processors embedded therein and/or coupled thereto, a smart phone, a hand-held computer, or any other wired or wireless, processor-driven device.

Examples of a network 120 include, but are not limited to, internet, local area network ("LAN"), wireless area network, wired area network, wide area network, and the like. The network 120 includes a wired or wireless telecommunication means by which network 120 systems communicate and exchange data. For example, each network 120 is implemented as, or is a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a Bluetooth low energy ("BLE") network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that exists in a computer-based environment.

Figure 2:
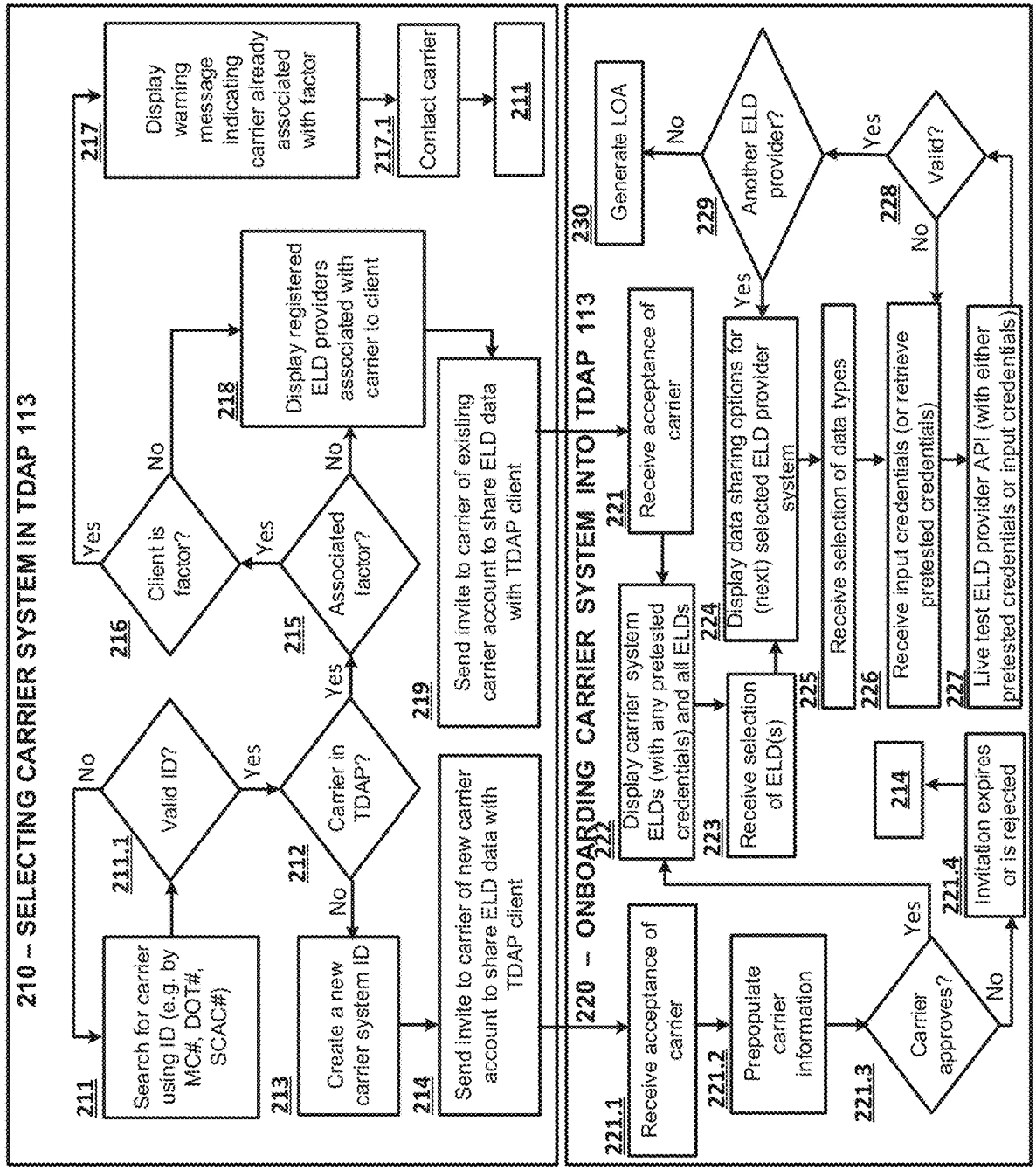
FIG. 2 depicts an example of a method for onboarding a carrier into a transportation data aggregator platform to enable sharing of electronic logging device information with a client system, according to certain embodiments described in the present disclosure.

Examples of Operations for Onboarding a Carrier Computing Device to Enable Sharing of ELD Data with a Client Computing Device FIG. 2 depicts an example of a method 210 for using a transportation data aggregator platform (TDAP) 113 to associate a carrier with a client. The method 220 includes onboarding the carrier to the TDAP 113 when needed. For illustrative purposes, the methods 210 and 220 are described with reference to the components illustrated in FIG. 1, although other implementations are possible. In certain examples, the program code for the TDAP 113 is stored in a non-transitory computer-readable medium or accessible to the TDAP 113. The program code is executed by one or more processing devices of the TDAP 113 to cause the TDAP 113 to perform one or more operations described herein in methods 210 and 220. In certain examples, the program code for the TDAP client application 165 the client computing device 161 is executed by one or more processing devices to cause the TDAP client application 165 client to perform one or more operations described herein in method 210. The TDAP client application 165 stores program code in a non-transitory computer-readable medium or accessible by the client computing device 161. In certain examples, the program code for the TDAP carrier application 135 of the carrier computing device 131 is executed by one or more processing devices to cause the TDAP carrier application 135 to perform one or more operations described herein in method 220. The program code for the TDAP carrier application 135 is stored in a non-transitory computer-readable medium on or accessible by the TDAP carrier computing device 131.

FIG. 2 depicts a method 210 for using a transportation data aggregator platform (TDAP) 113 to select a carrier to be associated with a client, in accordance with certain embodiments. In certain embodiments, method 210 is performed by the TDAP 113, which interacts with a client computing device 161.

The method 210 begins at block 211, where the TDAP 113 searches a verification system for a carrier account, using a verification identifier for the carrier. In certain examples, an operator of the client computing device 161 accesses the TDAP 113 via a TDAP client application 165. For example, the operator could be an agent of a client system of the TDAP 113 that is seeking access, using the TDAP 113, to ELD 141 data of carrier vehicles 140 associated with a carrier. In certain examples, the verification identifier for the carrier is a code, for example, a four character code associated with the carrier and known to the verification system. Verification systems include systems of government or regulatory entities, for example, the Federal Motor Carrier Safety Administration ("FMCSA"). In some instances, the verification system is a computing system of the government or regulatory entity that issues the verification identifier/code. Examples of verification identifiers include a motor carrier ("MC") number, a department of transportation ("DOT") number, and a standard carrier alpha code ("SCAM"). In certain examples, the TDAP 113 receives the verification identifier for the carrier and transmits, to the verification system, the verification identifier and a request to verify the verification identifier.

At block 211.1, the method 210 involves determining, by the TDAP 113, whether the verification identifier is valid. In certain examples, the verification system, in response to receiving the verification identifier, transmits, to the TDAP 113, a response that indicates that the received verification identifier is a valid verification identifier or a response that indicates that the received verification identifier is not a valid verification identifier. A valid verification identifier is known to the verification system and is associated with a carrier. In certain examples, along with a response indicating that the verification identifier is valid, the verification system also transmits a carrier identity (e.g. a carrier business name) associated with the verification identifier to the TDAP 113. In certain examples, the TDAP 113 displays, (e.g. via a user interface 169 of the client computing device 161) the carrier identity returned by the verification system. In some embodiments, in addition to receiving the carrier identity, the TDAP 113 receives, from the verification system, other information associated with the carrier identity, including one or more of location information, address information, contact information (e.g. a phone number, an email address), a date of registration with the verification system, or other information associated with the carrier identity.

If the identifier is not a valid carrier computing device 131 verification identifier, the method 210 returns to block 211. For example, the TDAP 113 receives, via the network 120 from the verification system, a notification that the verification identifier is not associated with a carrier computing device 131 known to the verification system. For example, the TDAP 113 queries the verification system using a subsequent verification identifier input via the user interface 169.

In other embodiments, the TDAP 113 queries the verification system using the verification identifier input via the user interface 169, receives an identity of a carrier associated with the verification identifier, and displays the identity via the user interface 169. However, in this other embodiment, the client computing device 161 operator views the displayed identity and determines that the identity does not correspond to a desired carrier. In this other embodiment, the operator inputs a subsequent verification identifier via the user interface 169 and the TDAP 113 queries the verification system using the subsequent verification identifier.

Returning to block 211.1, if the verification identifier is a valid carrier identifier, the method 210 proceeds to block 212. In certain embodiments, the client computing device 161 operator views a displayed carrier identity queried from the verification system and determines that the identity corresponds to a desired carrier and the operator confirms or otherwise selects, via one or more inputs via the user interface 169, the displayed carrier identity. The carrier computing device 161 receives, via the user interface 169, the one or more inputs confirming or selecting the carrier identity.

In block 212, the method 210 involves determining, by the TDAP 113, whether the identified carrier computing device 131 has an account with the TDAP 113. The TDAP 113 accesses a database, table, or other data structure that includes carrier identities associated with carrier computing devices 131 having accounts with the TDAP 113 and searches for the carrier identity (e.g. carrier business name) retrieved from the verification system. In some examples, the TDAP 113 searches for the carrier identity in the data structure. In some examples, the TDAP 113 searches for other information (e.g. address, contact information, location information) associated with the carrier that was returned to the TDAP 113 by the verification system after querying the verification identifier.

If the carrier does not have an account with the TDAP 113, the method 210 proceeds to block 213. For example, the TDAP 113 searches for the carrier identity retrieved from the verification system and determines that the carrier does not have an account with the TDAP 113. For example, if the TDAP 113 does not find an account for the carrier with the TDAP 113 by searching the data structure using the carrier identity, the verification identifier for the carrier, an address of the carrier, contact information of the carrier, or other information, the TDAP 113 determines that the carrier does not have an account with the TDAP 113.

In block 213, the method 210 involves creating, by the TDAP 113, a new carrier TDAP 113 account identifier. The TDAP 113 creates a new carrier account with the TDAP 113 to enable the carrier to share ELD 141 data of carrier vehicles 141 of the carrier with the TDAP 113. The TDAP 113 generates a new carrier TDAP 113 account identifier for the new carrier TDAP 113 account. The TDAP 113 associates, with the carrier TDAP 113 account, further information received from the verification system including location information, address information, contact information (e.g. a phone number, an email address), a date of registration with the verification system, or other information associated with the carrier identity.

In block 214, the method 210 involves sending, by the TDAP 113 for a new carrier TDAP 113 account, an invitation to a carrier computing device 161 to share ELD 141 data with the TDAP 113 client. The request can include a link to access, using the carrier computing device 161, the TDAP 113 using the carrier computing device 131. The request can include an identity of the TDAP 113 client that is requesting the sharing of the carrier's ELD 141 data. The TDAP 113 can send the request to the carrier via email, via text message, via instant message, or via other method of communication. In certain examples, the TDAP 113 received one or more addresses of the carrier for email, text message, instant message, or other communication means from the verification system responsive to querying the verification identifier of the carrier.

From block 214, the method proceeds to block 221.1 of FIG. 1. For example, the carrier is onboarded into the TDAP 113 so that ELD 141 data of carrier vehicles 140 of the carrier is received by the TDAP 113 from ELD provider platforms 152 and shared with the client computing device 161. Block 221.1 is within method 220 for onboarding, by the TDAP 113, the carrier and method 220 of FIG. 1 is described in further detail below.

Returning to block 212, if the carrier has an existing account with the TDAP 113, the method 210 proceeds to block 215. For example, the TDAP 113 searches for the carrier identity retrieved from the verification system and determines that the carrier has an existing account with the TDAP 113. For example, the TDAP 113 searches the data structure using carrier information including one or more of the carrier identity, the verification identifier for the carrier computing device 131, an address of the carrier, contact information of the carrier, or other carrier information. The TDAP 113 retrieves a carrier account identifier by searching in the data structure using the carrier information.

In block 215, the method 210 involves determining whether the identified carrier 131 is associated with a factor in the TDAP 113. The TDAP 113 retrieves account information of the carrier's TDAP 113 account that is associated with the carrier account identifier. The account information includes a list of clients of the TDAP 113 associated with the carrier account as well as an indication of a type of client (e.g. a shipper system, a factor client, a tech partner system, a broker system, etc.). The carrier is associated with a particular client of the TDAP 113 if the carrier account was previously configured, via the method 220 described herein, to enable sharing of ELD 141 data with the particular client of the TDAP 113. In certain embodiments, the carrier account cannot be associated with multiple clients of a particular type (e.g. factors). For example, regulatory rules prohibit associations of the carrier with multiple clients of a particular type. For example, the TDAP 113 cannot associate a second factor with a carrier if a first factor has already been associated with the carrier in the carrier account of the TDAP 113. Accordingly, the step at block 217 aims to prevent multiple associations of particular client types with the carrier TDAP 113 account from occurring.

If the carrier computing device 131 is not associated with a factor TDAP 113 client, the method 210 proceeds to block 218. For example, the TDAP 113 retrieves carrier TDAP 113 account information including a list of clients of the TDAP 113 associated with the carrier TDAP 113 account and an indication, for each associated client, an indication of a type of client. In this example, the TDAP 113 determines, from the list of clients, that none of the associated clients is a factor. In another example, the TDAP 113 determines that the carrier TDAP 113 account is not currently associated with any clients of the TDAP 113.

In block 218, the method 210 involves displaying, by the TDAP 113, registered ELD provider platforms 152 associated with the carrier TDAP 113 account. The TDAP 113 displays the registered ELD platforms 152 via the user interface 169 of the client computing device 161. Registered ELD provider platforms 152 are ELD provider platforms 152 which are enabled to share ELD 141 data of the carrier using the TDAP 113.

In block 219, the method 210 involves sending, by the TDAP 113, an invitation to the carrier computing device 131 to share ELD 141 data with the client of the TDAP 113. In certain embodiments, the TDAP 113 sends the request to the carrier computing device 131 via email, via text message, via instant message, or via other method of communication. The request includes a link to access, when selected via the user interface 139 of the carrier computing device 131, the carrier TDAP 113 account using the carrier computing device 131. The request includes an identity of the client that is requesting the sharing of the carrier's 131 ELD 141 data.

From block 219, the method 210 proceeds to block 221 of method 220. For example, the carrier is onboarded into the TDAP 113 so that the TDAP 113 receives ELD 141 data of carrier vehicles 140 of the carrier from ELD provider platforms 152 associated with the ELDs 141 and shares the ELD 141 data with the client. Block 221 is within method 220 for onboarding, by the TDAP 113, the carrier and method 220 of FIG. 1 is described in further detail below.

Returning to block 215, if the carrier computing device 131 account is associated with a factor client, the method 210 proceeds to block 216. For example, the TDAP 113 retrieves account information of the carrier's TDAP 113 account including a list of clients associated with the carrier's TDAP 113 account and an indication, for each associated client, of a type of client. In this example, the TDAP 113 determines, from the list of clients, one of the associated clients is a factor client.

In block 216, the method 210, the method 210 involves determining whether the client is a factor client. The TDAP 113 accesses a client TDAP 113 account and determine, from account information, a type of client (e.g. factor client, broker client, shipper client, tech partner client, etc.) for the client. The TDAP 113 determines whether the type of client, as indicated in the account information, is a factor or other type of client (e.g. broker, shipper, tech partner, etc.).

If the client is not a factor client, the method 210 proceeds to block 218. For example, the TDAP 113 determines that the carrier is already associated with a factor client but that the TDAP 113 client requesting ELD 141 data is not a factor client.

In block 218, the method 210 involves displaying, by the TDAP 113, registered ELD provider platforms 152 associated with the carrier TDAP 113 account. The TDAP 113 displays the registered ELD provider platforms 152 via the user interface 169 of the client computing device 161. Registered ELD provider platforms 152 are ELD provider platforms 152 enabled by carrier to share ELD 141 data with clients of the TDAP 113 via the TDAP 113.

In block 219, the method 210 involves sending, by the TDAP 113, an invitation to the carrier computing device 131 to share ELD 141 data with the client. In certain embodiments, the TDAP 113 communicates, via the network 120, the invitation to a TDAP carrier application 135 executing on a carrier computing device 131. In certain embodiments, the TDAP 113 sends the request to the carrier computing device 131 via email, via text message, via instant message, or via other method of communication. The invitation includes a request to share ELD 141 data of carrier vehicles 140 of the carrier with the client using the TDAP 113. The invitation includes an identity of the client of the TDAP 113 that is requesting the sharing of the carrier's ELD 141 data. The invitation can include a link to access, when selected via the user interface 139 of the carrier computing device 131, the carrier TDAP 113 account on the TDAP 113 using the carrier computing device 131. In some instances, the link opens the TDAP carrier application 135, for example, the link opens a web browser of the carrier computing device 131 to access the TDAP carrier application 135 to communicate with the TDAP 113 website via the network 120 or the link causes a stand-alone TDAP carrier application 135 that is downloaded on the carrier computing device 131 to open and communicate with the TDAP 113 via the network 120.

From block 219 the method 210 proceeds to block 221 of method 220. For example, the carrier computing device 131 is onboarded into the TDAP 113 so that ELD 141 data of carrier vehicles 141 of the carrier are received by the TDAP 113 from ELD provider platforms 152 and shared with the client of the TDAP 113 that is requesting ELD 141 data. Block 221 is within method 220 for onboarding, by the TDAP 113, the carrier and method 220 of FIG. 1 is described in further detail below.

Returning to block 216, if the client is a factor client, the method 210 proceeds to block 217. For example, the TDAP 113 determines that (1) the carrier TDAP 113 account is already associated with a factor client and (2) the client requesting ELD 141 data is also a factor client.

In block 217, the method 210 involves displaying, by the TDAP 113, a warning message indicating that the carrier TDAP 113 account is already associated with a factor client. The TDAP 113 displays, via the user interface 169 of the client computing device 160, a message that indicates that a factor client other than the client currently requesting ELD 141 data is already associated with the carrier TDAP 113 account. In certain embodiments, the TDAP 113 further displays, via the client computing device 160, information associated with the factor client that is already associated with the carrier TDAP 113 account, for example, a factor client name and contact information.

In block 217.1, the method 210 involves contacting, by the TDAP 113, the carrier. In an example, the TDAP 113 sends a notification to the carrier computing device 131 via email, via text message, via instant message, or via other method of communication. The carrier computing device 131 displays, via the user interface 139, the notification. For example, the operator opens the email, text message, or other communication and views the notification displayed via the user interface 139. The notification includes an identity of the factor client that is requesting the sharing of the carrier computing device's 131 ELD 141 data and contact information of the factor client. In certain embodiments, the notification includes a link, selection of the link via the user interface 139 causes the carrier computing device 131 to access (e.g. via the TDAP carrier application 135) the carrier TDAP 113 account. In certain embodiments, the operator of the carrier computing device 131 contacts the client of the TDAP 113 that requested sharing of the carrier's ELD 141 data. In certain embodiments, the operator of the carrier computing device 131 configures settings of the carrier TDAP 113 account to disassociate the carrier TDAP 113 account from the other factor client so that, upon a subsequent request by the requesting factor client, the carrier TDAP 113 account can be associated with the requesting factor client.

In certain examples, from block 217.1, the method 210 returns to block 211 of method 210. In certain embodiments, the TDAP 113 displays, along with the warning message, user interface 169 objects associated with options for one or more of searching for another carrier computing device 131, exiting the TDAP 113, logging out of the client TDAP 113 account, or other option. In certain embodiments, the operator of the client computing device 161 selects an option to search for another carrier and, in response to detecting a selection of the option to search for another carrier, the TDAP 113 displays a search box that can receive a subsequent verification identifier associated with a subsequent carrier.

FIG. 2, in addition to depicting the method 210, also depicts a method 220 for onboarding, by the TDAP 113, the carrier, in accordance with certain embodiments. In certain embodiments, method 220 is performed by the TDAP 113, which interacts with a carrier computing device 131 operated by a carrier and with one or more ELD provider platforms 152. In some instances, the carrier computing device 131 is operated by an agent of the carrier.

As illustrated in FIG. 2, the method 220 follows the method 210 and begins at either block 221 or 221.1. In one embodiment, the method 220 begins at block 221 before proceeding to block 222. In this embodiment, method 220 involves onboarding a carrier that already has a carrier TDAP 113 account with the TDAP 113. Alternatively, in another embodiment, the method 220 begins at block 221.1 and proceeds through blocks 221.2 and 221.3 before proceeding to block 222. In this other embodiment, method 220 involves onboarding a carrier that does not already have a carrier TDAP 113 account.

In certain embodiments, at block 221, the method 220 involves receiving, by the TDAP 113, an acceptance from the carrier computing device 131. For example, at block 219 of method 210, the TDAP sent an invitation to the carrier computing device 131 after determining that the carrier already has a carrier TDAP 113 account. In certain embodiments, the TDAP carrier application 135 executing on the carrier computing device 131 receives the invitation. The invitation is in the form of an email, text message, instant message, or other form of network communication. The invitation includes a request to share ELD 141 data of the carrier with the requesting client of the TDAP 113 using the TDAP 113. The invitation includes an identity of the client that is requesting the sharing of the carrier's 131 ELD 141 data. The invitation includes a link or other object that can be displayed on the user interface 139, a selection of the link or other object via the user interface 139 causing the carrier computing device 131 to transmit an acceptance response to the TDAP 113 at step 221. The link or other object of the user interface 139, when selected, could cause the carrier computing device 131 to access, via the TDAP client application 165 or other application (e.g. web browser), the carrier TDAP 113 account on the TDAP 113. For example, the operator of the carrier computing device 131 views the displayed invitation and selects an object on the user interface 139 to accept the invitation. In certain embodiments, the invitation can expire after a certain amount of time passes without the TDAP 113 receiving an acceptance from the carrier computing device 131. Further, in some instances, if the invitation is sent to the wrong destination (e.g. to the wrong email address), TDAP 113 can resend the invitation to a correct destination responsive to receiving an indication of the correct destination from one or more of an operator of the carrier computing device 131 or an operator of the TDAP 113.

In certain embodiments, the method 220 begins at step 211.1 with the TDAP 113 receiving an acceptance from the carrier computing device 131. For example, at block 214 of method 210, the TDAP 113 sent an invitation to the carrier computing device 131 after determining that the carrier did not previously have a carrier TDAP 113 account. The invitation includes a request to share ELD 141 data with the client using the TDAP 113. In certain embodiments, the carrier computing device 131 receives the invitation from the TDAP 113 in the form of email, text message, instant message, or other means of communication. The invitation includes an identity of the client of the TDAP 113 that is requesting the sharing of the carrier's 131 ELD 141 data. The invitation could include a link or other object to be displayed on the user interface 139. In an example, the operator of the carrier computing device 131 views the displayed invitation and selects an object on the user interface 139 to accept the invitation to share ELD 141 data with the client. Selection of the link or other object via the user interface 139 can cause the carrier computing device 131 to transmit an acceptance response to the TDAP 113 at step 221.1.

In certain embodiments, responsive to receiving the acceptance, the TDAP 113 communicates with the carrier computing device 131 to onboard the carrier. In certain embodiments, selection of the link or other object in the invitation via the user interface 139 causes the carrier computing device 131 to access the TDAP 113 (e.g. a TDAP 113 website) using a TDAP client application 165 that operates in a web browser of the carrier computing device 131 (e.g. a script running in the web browser) via the network 120. In other examples, selection of the link or other object in the invitation causes the carrier computing device 131 to download, from the TDAP 113, a TDAP client application 165 that communicates with the TDAP 113 via the network 120.

At block 221.2, the method 220 involves prepopulating, by the TDAP 113, the carrier TDAP 113 account information. The TDAP 113 can instruct or cause the display, on the user interface 139 of the carrier computing device 131, of an account setup form requesting carrier information to set up an account. In certain embodiments, TDAP client application 165 instructs or causes display of the account setup form via the user interface 139. The account setup form includes one or more input fields for receiving account setup information from an operator of the carrier computing device 131 via the user interface 139. Example input fields could include one or more of a business name input field, an address input fields, a telephone number input field, an email address input field, an identifier input field (e.g. for receiving an MC, DOT, SCAC, or other identifier), or other input field. Prepopulating the carrier account information includes prepopulating one or more of the input fields of the account setup form with information known to the TDAP 113. In an example, the TDAP 113 received information including one or more of a business name, address information, contact information, one or more identifiers (e.g. MC, DOT, and/or SCAC identifiers) of the carrier, or other information from the verification system (e.g. as described in block 211.1 above) and prepopulates one or more fields of the account setup form with this information. Input fields could include text input fields, checkboxes or other selection boxes, drop down menus, or other types of input field.

At block 221.3, the method 220 involves, by the TDAP 113, receiving an approval of the carrier TDAP 113 account information or not receiving an approval of the carrier TDAP 113 account information from the carrier computing device 131. The account setup form includes objects, displayed via the user interface 139 where (A) selection of a first object via the user interface 139 causes the carrier computing device 131 to communicate an approval of the data displayed in the one or more input fields of the account setup form and (B) selection of a first object via the user interface 139 causes the carrier computing device 131 to communicate an rejection of the data displayed in the one or more input fields of the account setup form. The objects displayed via the user interface 139 may include text, for the first object, that reads "The account information above is correct; please share my ELD data with the requesting client" and, for the second object, that reads "Do not share ELD data with the requesting client."

If the TDAP 113 does not receive an approval of the carrier computing device 131 account information from the carrier computing device 131, the method 220 proceeds to block 221.4. The account setup form includes an object, displayed via the user interface 139 and selection of the object via the user interface 139 causes the carrier computing device 131 to communicate a rejection of the data displayed in the one or more input fields of the account setup form. For example, the object displayed via the user interface 139 reads "Do not share ELD data with the requesting client system." In another example, the account setup form includes one or more objects, displayed via the user interface 139 and selection of the object via the user interface 139 causes the carrier computing device 131 to enable editing of the data displayed in the one or more fields of the account setup form.

At block 221.4, the method 220 involves the invitation expiring or otherwise receiving an input rejecting the invitation. In certain embodiments, the carrier computing device 131 receives one or more inputs via the user interface 139 to one or more input fields of the carrier computing device 131 to reject the prepopulated carrier information. In another embodiment, the carrier computing device 131 does not receive any inputs approving the carrier computing device 131 account information within a predefined amount of time after the TDAP 113 sent the invitation. In this embodiment, the invitation expires after the predefined amount of time.

From block 221.4, the method 220 proceeds to block 214 of method 210. For example, the TDAP 113 sends a new invitation to the carrier having a new carrier count inviting the carrier to share ELD data 141 with a TDAP 113 client.

Retuning to block 221.3, when the TDAP 113 receives an approval of the carrier TDAP 113 account information from the carrier computing device 131, the method 220 proceeds to block 222, where carrier computing device 131 displays ELD provider platforms 152 associated with the carrier TDAP 113 account and all ELD provider platforms 152 associated with the TDAP 113. In some instances, the carrier computing device 131 displays ELD provider platforms 152 associated with the carrier TDAP 113 account along with, for one or more of the ELD provider platforms 152, credentials previously found to be valid via a previous API test with the ELD provider platform 152, and all ELD provider platforms 152 associated with the TDAP 113. The TDAP 113 retrieves, from the data storage unit 115, all ELD provider platforms 152 known to the TDAP 113 and from which ELD 141 data has been received by the TDAP 113 for sharing with one or more clients of the TDAP 113. The TDAP 113 can also retrieve, from the data storage unit 115, information identifying one or more ELD provider platforms 152 associated with the carrier TDAP 113 account. In an example, the carrier previously approved sharing of ELD 141 data associated with an ELD provider platform 152 data. In certain examples, information identifying the one or more ELD provider platforms 152 associated with the carrier TDAP 113 account includes (A) information associated with one or more ELD provider platforms 152 for which the carrier previously approved sharing of ELD 141 data, and/or (B) information associated with one or more ELD provider platforms 152, which the carrier otherwise provided to the TDAP 113 to associate with the carrier TDAP 113 account. The TDAP 113 displays, in a carrier account summary page and via the user interface 139, the ELD provider platforms 152 associated with the carrier TDAP 113 account and all ELD provider platforms 152 associated with the TDAP 113.

Whether arriving at block 222 (A) from block 221 or (B) from block 221.3, the method 220 proceeds from block 222 to block 223, where the TDAP 113 receives from the carrier computing device 131 a selection of ELD provider platforms 152. In an example embodiment, the TDAP 113 provides, in the carrier account summary page, one or more user interface 169 objects that enable an operator of the carrier computing device 131 to select ELD provider platforms 152 corresponding to ELD 141 data that the carrier computing device 131 desires to share with the client requesting the ELD 141 data via the TDAP 113. For example, the TDAP 113 displays, in the carrier account summary page, a set of all ELD provider platforms 152 known to the TDAP 113 and selects, highlights, or otherwise indicates a subset of one or more of the ELD provider platforms 152. In this example, the operator of the carrier computing device 131, via one or more inputs to the user interface 139, (A) selects, highlights, or otherwise expands the subset of selected ELD provider platforms 152 and/or (B) unselects, removes a highlight, or otherwise narrows the subset of selected ELD provider platforms 152.

In some instances, the carrier computing device 131 operator selects an additional ELD provider platform 152 because the carrier has acquired new ELDs 141 associated with a new ELD provider platforms 152 and desires to share data of the new ELD provider platform 152 with the TDAP 113. In other instances, the carrier computing device 131 operator unselects one or more ELD provider platforms 152 from the selected subset because the carrier does not wish to share ELD 141 data associated with the unselected ELD provider platforms 152. In another example, the operator of the carrier computing device 131 does not modify the selection of the original subset of ELD provider platforms 152 associated with the carrier TDAP 113 account. When the operator of the carrier computing device 131 is satisfied with the selected subset of ELD provider platforms 152, the carrier computing device 131 operator selects an option, via the user interface 139, to confirm the selected subset of ELD provider platforms 152 for sharing of ELD 141 data. The carrier computing device 131, in response to receiving the selection of the option to confirm the selected subset of ELD provider platforms 152, communicates, to the TDAP 113, the selected subset of ELD provider platforms 152.

In certain embodiments, blocks 224, 225, 226, 227, 228, and 229 are repeated for each ELD provider platforms 152 selected by the carrier computing device 131 operator in block 223. In certain embodiments, the TDAP carrier application 135 executes a loop wizard that performs one or more functions described in blocks 224, 225, 226, 227, 228, and 229. In an example, if the carrier computing device 131 operator selected three ELD provider platforms 152, then the operator of the carrier computing device 131 interacts with the loop wizard, which performs blocks 224, 225, 226, 227, 228, and 229 for the first selected ELD provider platform 152, then repeats these blocks for the second selected ELD provider platform 152, and then repeats these blocks for the third selected ELD provider platform 152. Accordingly, in this example, the "next selected ELD provider platform 152" as described in blocks 224, 225, 226, 227, 228, and 229 comprises the first selected ELD provider platform 152 the first time these steps are performed, the second selected ELD provider platform 152 the second time these steps are performed, and the third selected ELD provider platform 152 the third time these steps are performed. In this example, if the carrier computing device 131 operator only selected a single ELD provider platform 152, these steps are only performed once for the single selected ELD provider platform 152.

At block 224, the method 220 involves displaying, via the TDAP 113, data sharing options for a next selected ELD provider platform 152. The TDAP 113 retrieves, from the data storage unit 115, data sharing options for the next selected ELD provider platform 152. Data sharing options include a list of types of data logged by ELDs 141 associated with the next selected ELD provider platform 152 that the ELD provider platform 152 can share with the TDAP 113. The TDAP 113 displays, via the user interface 139, the list of types of data logged by the ELDs 141 associated with the next selected ELD provider platform 152 as well as a selectable user interface 139 object (e.g. a checkbox) for each type of data. The list of types of data logged by ELDs 141 could include one or more of location data (e.g. global positioning system location coordinates), a location history, velocity data (e.g. a speed in miles per hour or kilometers per hour), accelerometer data (e.g. an orientation or alignment of the ELD 141), times of operation, an accumulated time of operation, idle times, an accumulated idle time, times of transit, an accumulated transit time, navigation system data, camera device data (e.g. from a dashboard camera), sound data (e.g. from a microphone device), or other data that can be determined directly by the ELD 141 or received by the ELD 141 from a computing device communicatively coupled to the ELD 141 (e.g. a camera feed received from a dashboard camera device that communicates wirelessly with the ELD 141).

At block 225, the method 220 involves receiving, by the TDAP 113, a selection of data types for the next selected ELD provider platform 152 to share with the TDAP 113. In an example, the list of types of data for the next selected ELD provider system 150 includes (a) location data, (b) times of operation, and (c) camera device data and the operator of the carrier computing device 131 selects, via the user interface 139, (a) location data and (b) times of operation, but does not select (c) camera device data. The TDAP 113 displays an object on the user interface 139 to confirm a selection of one or more types of data from the list of types of data. The client computing device 131 receives, via the user interface 139, a selection of the object to confirm the selection of the one or more types of data from the list of types of data.

At block 226, the method 220 involves receiving, by the TDAP 113, credentials associated with the next selected ELD provider platform 152. The TDAP 113 displays, via the user interface 139, in response to receiving the confirmation of the selection of the one or more types of ELD 141 data, a request for credentials associated with a carrier ELD provider platform 152 account that the carrier has with the ELD provider platform 152 and an input field to receive credentials input by the operator of the carrier computing device 131 and a user interface 169 object to submit credentials input to the input field. In this example, the TDAP 113 receives the credentials input into the input field by the operator of the client computing device 131 in response to the client computing device 131 receiving a selection of the user interface 169 object to submit the credentials. In another embodiment, the TDAP 113 displays the input field to receive credentials along with the list of data types displayed in block 225 and the TDAP 113 receives the credentials input into the input field by the operator of the client computing device 131 in response to the client computing device 131 receiving a selection of a user interface 169 object to submit the credentials and the selection one or more data types in the list of data types. Credentials could be one or more of a user name, a password, an API key, or other information. In some embodiments, the carrier associated with the carrier computing device 131 previously provided credentials for one or more ELD provider platforms 152, wherein one or more credentials were verified via testing an API of the respective ELD provider platforms 152. In these embodiments, the operator of the carrier computing device 131 does not need to input credentials for the next ELD provider platform 152 if the next ELD provider platform 152 has preverified (pretested) credentials stored by the TDAP 113. Instead, the TDAP 113, in these instances, retrieves stored preverified credentials for the next ELD provider platform 152.

At block 227, the method 220 involves live testing, by the TDAP 113, an application programming interface ("API") of the next selected ELD provider platform 152. The TDAP 113 live tests the API by communicating, with the API of the next selected ELP provider system 150, providing the credentials input via the carrier computing device 131 to the API (or the preverified credentials retrieved by the TDAP 113), and receiving a response from the API. In certain embodiments, the TDAP 113 communicates a request for the selected types of data described in block 225 to the API and receives a response confirming that the ELD provider platform 152 can share the requested types of data. However, in other embodiments, the TDAP 113 does not communicate a request for selected types of data to the API.

At block 228, the method 220 involves determining, by the TDAP 113, whether the credentials provided for the next selected ELD provider platform 152 are valid. The TDAP 113 receives a response, from the ELD provider platform 152 during the API live test, that indicates that the credentials are valid or a response that indicates that the credentials are invalid or not recognized. In certain embodiments, at block 228, the method 220, in addition to determining whether the credentials are valid, also involves determining, by the TDAP 113, whether the next selected ELD provider platform 152 can share each of the selected types of ELD 141 data. The TDAP 113 receives, from the ELD provider platform 152 during the API live test and for each selected type of the selected types of data, a positive response that indicates that the next selected ELD provider platform 152 can share the selected type of data or a negative response that indicates that the next selected ELD provider platform 152 cannot share the selected type of data. In certain examples, the positive response includes receiving a stream of ELD 141 data from the next selected ELD provider platform 151. In certain examples, the TDAP 113 makes the stream of ELD 141 data obtained during the API live test available to the carrier computing device 131 to show an operator of the carrier computing device 131 that the next selected ELD provider platform 151 has successfully been onboarded. Also, in certain examples, the TDAP 113 makes the stream of ELD 141 data obtained during the API live test available to the client computing device 161 to show an operator of the client computing device 161 that the next selected ELD provider platform 151 has successfully been onboarded.

If the TDAP 113 determines that the credentials are not valid, the method 220 returns to block 226. For example, the operator of the carrier computing device 131 previously inputted incorrect credentials and re-inputs the credentials correctly. In certain embodiments, if the TDAP 113 receives one or more responses that indicate that the next selected ELD provider platform 152 cannot share the selected type of data, the method 220 returns to block 225 and the operator of the carrier computing device 131 selects one or more types of ELD 141 data for the ELD provider system 150 to share with the TDAP 113. In certain examples, when returning to block 225, the TDAP 113 displays a notification via the user interface 139 advising the operator of any types of data for which the TDAP 113 received a negative response from the ELD provider system 150 during the live API test. Accordingly, the operator can unselect type(s) of data corresponding to the negative response(s) and resubmit the credentials.

If the TDAP 113 determines that the credentials are valid in the live API test, the method 220 proceeds to block 228. In certain embodiments, the method 220 proceeds to block 228 if the TDAP 113 (A) determines that the credentials are valid in the live API test and (B) the TDAP 113 receives positive responses during the live API test for each of the selected types of ELD 141 data.

At block 229, the method 220 involves determining, by the TDAP 113, whether a subsequent selected ELD provider platform 152 was selected by the carrier computing device 131. For example, the TDAP 113 can, as described in block 223, receive a selection of a single ELD provider platform 152 or of multiple ELD provider platforms 152 known to the TDAP 113.

If the TDAP 113 determines that a subsequent selected ELD provider platform 152 was selected by the carrier computing device 131, the method 220 returns to block 224. For example, in instances where the carrier computing device 131 has carrier vehicles 140 including ELDs 141 associated with multiple ELD provider platforms 152, the TDAP 113 receives a selection of multiple ELD provider platforms 152. In this example, the method 220 repeats blocks 224, 225, 226, 227, and 228 for each of the selected ELD provider platforms 152 and each of the subsequent selected ELD provider platforms 152, in turn, is treated as the next selected ELD provider platform 152 as described in these blocks.

Returning to block 229, if the TDAP 113 determines that a subsequent selected ELD provider platform 152 does not exist, the method 220 proceeds to block 230. For example, in instances where the carrier computing device 131 has carrier vehicles 140 including ELDs 141 associated with a single ELD provider platform 152, the TDAP 113 receives a selection of the single ELD provider platform 152. In this example, the method 220 proceeds to block 230 after completing block 229.

At block 230, the method 220 involves generating, by the TDAP 113, a letter of authorization ("LOA") for the carrier computing device 131. The LOA enables the TDAP 113 to receive or otherwise access ELD 141 data from the one or more ELD provider platforms 152 selected by the carrier computing device 131 operator in block 223 upon verification via live API testing, for each selected ELD provider platform 152, that (A) the credentials provided by carrier via the carrier computing device 131 are valid and (B) one or more selected ELD 141 data types are shareable by the ELD provider platform 152 to the TDAP 113. For example, upon successful verification of each of the selected ELD provider platforms 152 via the loop wizard, the TDAP 113 generates, for each of the verified ELD provider platforms 152, an LOA. In certain examples, the LOA includes an agreement between the TDAP 113 and the carrier granting authorization to the TDAP 113 (A) to access or receive ELD 141 data from each of the selected and verified ELD provider platforms 152 and (B) to share the accessed or received ELD 141 data with the client of the TDAP 113 that requested sharing of the carrier's ELD 141 data.

In response to generating the LOA, the TDAP 113 begins receiving and/or accessing ELD 141 data from each of the ELD provider platforms 152 specified in the LOA. Further, the TDAP 113 transmits the received/accessed ELD 141 data to, or otherwise makes the received/accessed ELD 141 data available for access by, the client of the TDAP 113. For example, the TDAP 113 makes the received/accessed ELD 141 data available for access by the client via the client TDAP 113 account. In an example, the client receives or accesses the ELD 141 data via one or more computing devices, including the client computing device 161. In certain embodiments, responsive to generating the LOA, the TDAP 113 notifies the client computing device 161 (e.g. of the broker, of the technology partner system, of the 3PL provider, of the shipper, of the factor, etc.) that the carrier has been successfully onboarded to the TDAP 113.

In certain embodiments, the carrier, using the carrier computing device 131, accesses the TDAP 113 (e.g. via the carrier computing device 131) and revoke the LOA. In response to receiving a request from the carrier computing device 131 to revoke the LOA, the TDAP 113 ceases to request, ceases to receive, or otherwise ceases to access ELD 141 data of carrier vehicles 140 of the carrier computing device 140 from the ELD provider platforms 152 specified in the LOA. Further, in response to receiving the request from the carrier computing device 131 to revoke the LOA, the TDAP 113 ceases to transmit or otherwise cease to make available for access the ELD 141 data to the client.

Example of a Computing System for Implementing Certain Embodiments

Figure 3:
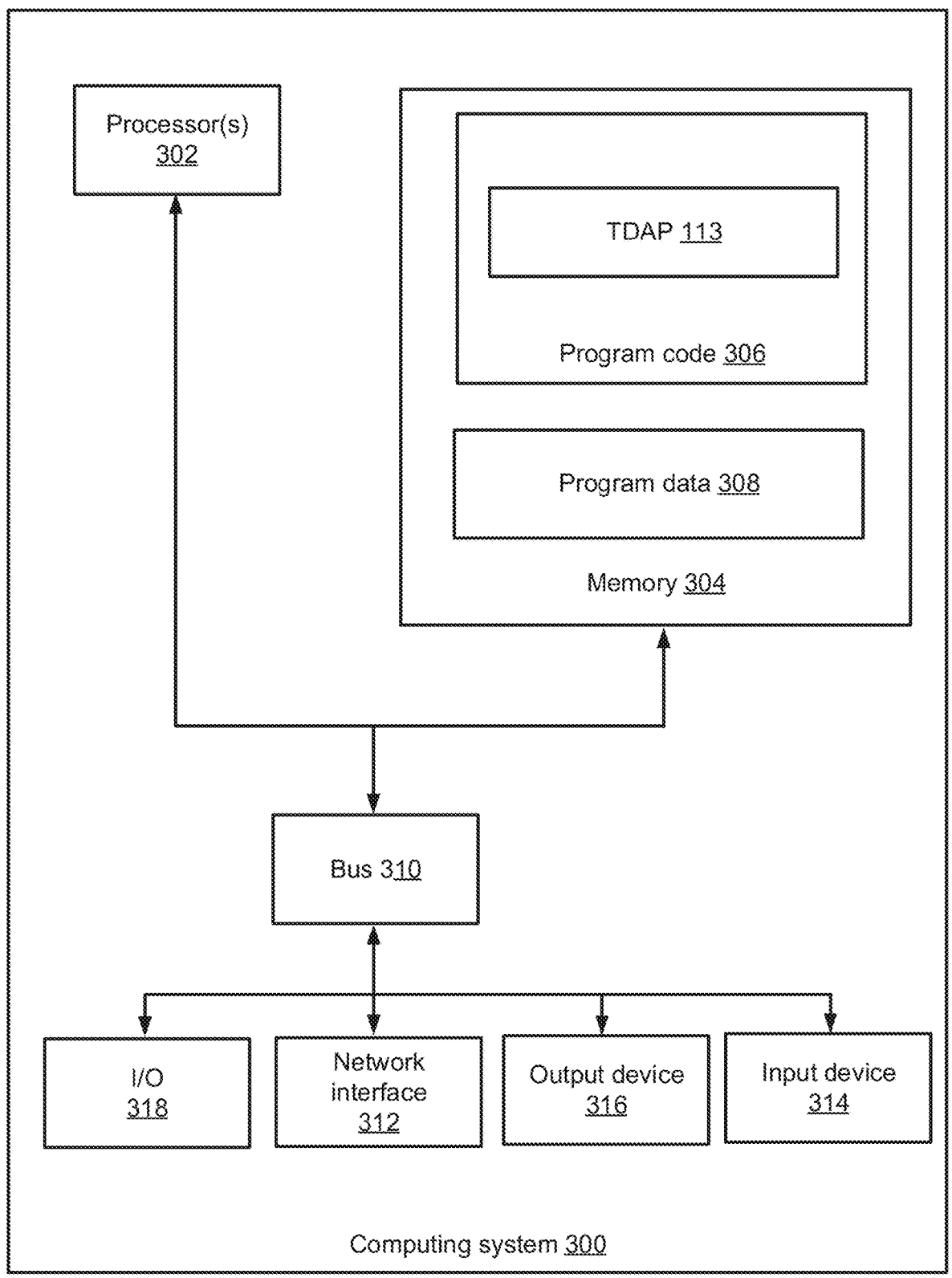
FIG. 3 depicts an example of a computing system that performs certain operations described herein, according to certain embodiments described in the present disclosure.

Any suitable computing system or group of computing systems is used for performing the operations described herein. For example, FIG. 3 depicts an example of a computing system 300. The computing system 300 includes the TDAP 113.

The depicted examples of a computing system 300 includes one or more processors 302 communicatively coupled to one or more memory devices 304. The processor 302 executes computer-executable program code stored in a memory device 304, accesses information stored in the memory device 304, or both. Examples of the processor 302 include a microprocessor, an application-specific integrated circuit ("ASIC"), a field-programmable gate array ("FPGA"), or any other suitable processing device. The processor 302 includes any number of processing devices, including a single processing device.

The memory device 304 includes any suitable non-transitory computer-readable medium for storing data, program code, or both. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions.

The computing system 300 executes program code 306 that configures the processor 302 to perform one or more of the operations described herein. The program code 306 includes, for example, the TDAP 113 including the TDAP 113, or other suitable applications that perform one or more operations described herein, for example, the TDAP carrier application 135 and/or the TDAP client application 165. The program code 306 is resident in the memory device 304 or any suitable computer-readable medium and is executed by the processor 302 or any other suitable processor. The program code includes processor-specific instructions generated by a compiler or an interpreter from code written in any suitable computer-programming language, including, for example, C, C++, C#, Visual Basic, Java, Python, Perl, JavaScript, and ActionScript.

In some embodiments, program code 306 for implementing the visualization application 139 are stored in the memory device 304, as depicted in FIG. 3. In additional or alternative embodiments, program code 306 for the TDAP 113 is stored in different memory devices of different computing systems. In additional or alternative embodiments, the program code 306 described above is stored in one or more other memory devices accessible via a data network.

The computing system 300 accesses program data 308, which includes one or more of the datasets described herein (e.g., data from ELD provider systems 150), in any suitable manner. In some embodiments, some or all of one or more of these data sets, models, and functions are stored as the program data 308 in the memory device 304, as in the example depicted in FIG. 3. In additional or alternative embodiments, one or more of these data sets, models, and functions are stored in the same memory device (e.g., one of the memory device 304). For example, a common computing system, such as the TDAP 113 depicted in FIG. 1, includes hardware, software, or both that implements the TDAP 113. In additional or alternative embodiments, one or more of the programs, data sets, models, and functions described herein are stored in one or more other memory devices accessible via a data network.

The computing system 300 also includes a network interface device 312. The network interface device 312 includes any device or group of devices suitable for establishing a wired or wireless data connection to one or more data networks. Non-limiting examples of the network interface device 312 include an Ethernet network adapter, a modem, and the like. The computing system 300 is able to communicate with one or more other computing devices (e.g., carrier computing devices 131, client computing devices 161, computing devices of ELD provider platforms 152) via a data network using the network interface device 312.

The computing system 300 also includes a number of external or internal devices, such as input or output devices. For example, the computing system 300 is shown with one or more input/output ("I/O") interfaces 318. An I/O interface 318 receives input from input devices or provide output to output devices. One or more buses 310 are also included in the computing system 300. The bus 310 communicatively couples one or more components to other components of the computing system 300.

In some embodiments, the computing system 300 also includes the input device 314 and the output device 316 depicted in FIG. 3. An input device 314 includes any device or group of devices suitable for receiving visual, auditory, or other suitable input that controls or affects the operations of the processor 302. Non-limiting examples of the input device 320 include a touchscreen, a mouse, a keyboard, a microphone, a separate mobile computing device, etc. An output device 316 includes any device or group of devices suitable for providing visual, auditory, or other suitable sensory output. Non-limiting examples of the output device 316 include a touchscreen, a monitor, a speaker, a separate mobile computing device, etc.

Although FIG. 3 depicts the input device 314 and the output device 316 as being local to the computing system 300 that executes the program code 306, other implementations are possible. For instance, in some embodiments, one or more of the input device 314 and the output device 316 includes a remote client-computing device that communicates with the computing system 300 via the network interface device 312 using one or more data networks described herein. In some embodiments, the client computing device 161 and/or the carrier computing device 131 comprises the output device 316 and/or the input device 314 and is communicatively coupled to the computing system 300 via the network interface 312.

Figure 4:
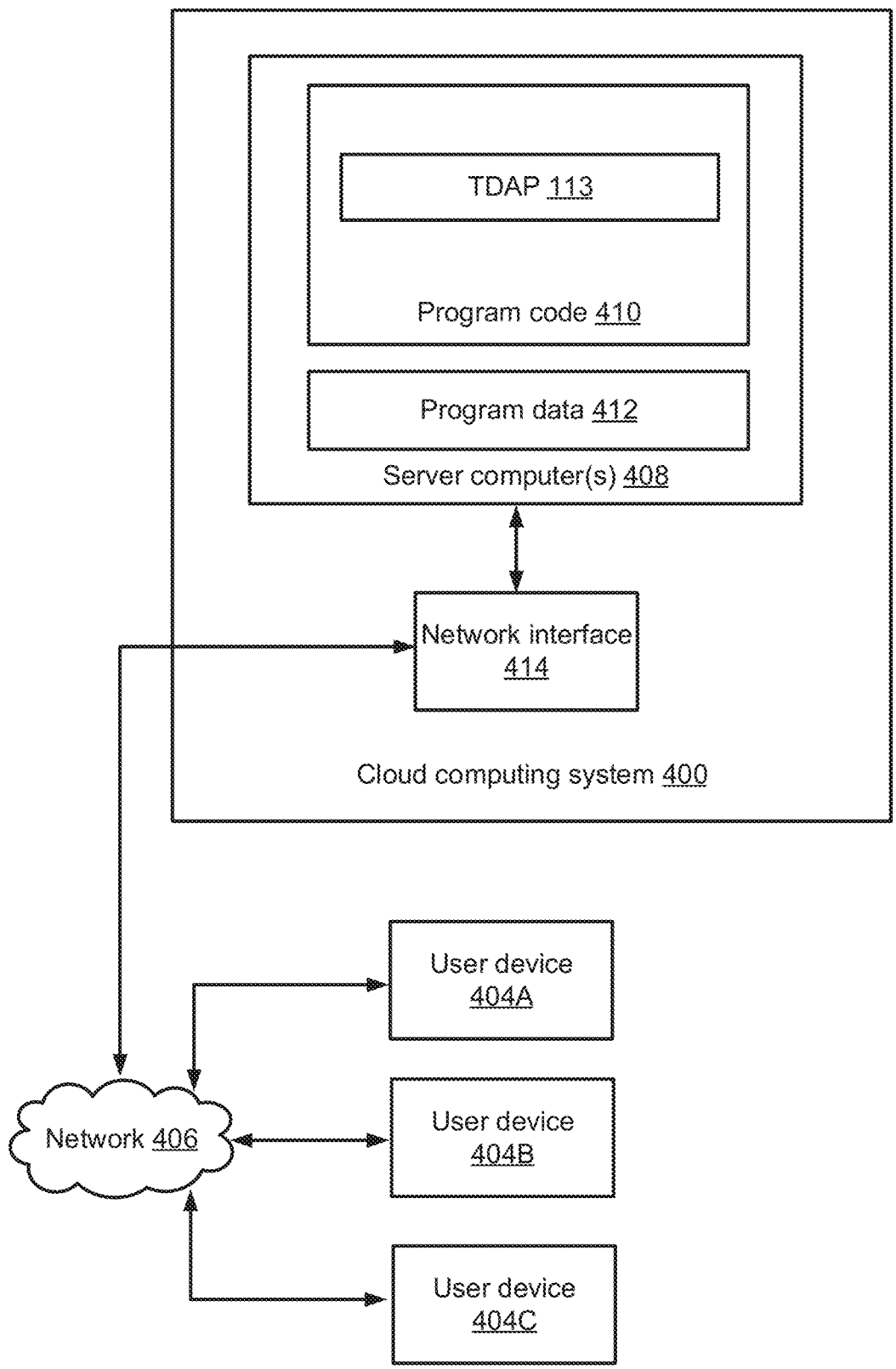
FIG. 4 depicts an example of a cloud computing system that performs certain operations described herein, according to certain embodiments described in the present disclosure.

In some embodiments, the functionality provided by computer system 300 is offered as cloud services by a cloud service provider. For example, FIG. 4 depicts an example of a cloud computer system 400 offering the TDAP 113 that is used by a number of user subscribers including user subscribers using user devices 404A, 404B, and 404C across a data network 406. In the example, the TDAP carrier application 135, TDAP client application 165, or other TDAP application is offered under a Software as a Service (SaaS) model. One or more users subscribe to the TDAP 113 service, and the cloud computer system 400 performs one or more functions of TDAP 113 or TDAP carrier application 135/165 for subscribers. For example, the cloud computer system 400 performs services including one or more of steps or functions illustrated in FIG. 2 described herein. The cloud computer system 400 includes one or more remote server computers 408.

The remote server computers 408 include any suitable non-transitory computer-readable medium for storing program code 410 (e.g., the TDAP 113, the TDAP application 135, the TDAP client application 165) and program data 412, or both, which is used by the cloud computer system 400 for providing the cloud services. A computer-readable medium includes any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device reads instructions. The instructions include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 808 include volatile memory, non-volatile memory, or a combination thereof.

One or more of the server computers 408 execute the program code 410 that configures one or more processors of the server computers 408 to perform one or more of the operations that provide one or more methods described herein (e.g., the methods of FIG. 2 described herein). As depicted in the embodiment in FIG. 4, the servers implement TDAP 113, TDAP carrier application 135, and/or TDAP client application 165. Any other suitable systems or subsystems that perform one or more operations described herein (e.g., one or more development systems for configuring an interactive user interface) are also implemented by the cloud computer system 400.

In some embodiments, the cloud computer system 400 implements the services by executing program code and/or using program data 412, which is resident in a memory device of the server computers 408 or any suitable computer-readable medium and is executed by the processors of the server computers 408 or any other suitable processor.

In some embodiments, the program data 412 includes one or more datasets and models described herein. Examples of these datasets include training data. In some embodiments, one or more of data sets, models, and functions are stored in the same memory device. In additional or alternative embodiments, one or more of the programs, data sets, models, and functions described herein are stored in different memory devices accessible via the data network 406. The cloud computer system 400 also includes a network interface device 414 that enable communications to and from cloud computer system 400. In some embodiments, the network interface device 414 includes any device or group of devices suitable for establishing a wired or wireless data connection to the data networks 406.

Non-limiting examples of the network interface device 414 include an Ethernet network adapter, a modem, and/or the like. The TDAP 113 service is able to communicate with the user devices 404A, 404B, and 404C via the data network 406 using the network interface device 414.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The examples of systems, methods, and acts described in the embodiments presented previously are illustrative, and, in alternative embodiments, certain acts can be performed in a different order, in parallel with one another, omitted entirely, and/or combined between different embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method that includes performing, with one or more processing devices of a transportation data aggregator platform ("TDAP"), operations comprising:
    receiving, by the one or more processing devices of the TDAP from a computing device of a carrier, a selection of one or more electronic logging device ("ELD") provider systems associated with ELDs of vehicles of the carrier;
    for each of the one or more selected ELD provider systems:
        displaying, by the one or more processing devices of the TDAP on the computing device of the carrier, a request for credentials associated with the selected ELD provider system;
        receiving, by the one or more processing devices of the TDAP via the computing device of the carrier, an input comprising the credentials;
        communicating, by the one or more processing devices of the TDAP to the ELD provider system, the credentials;
        receiving, by the one or more processing devices of the TDAP from the ELD provider system, a response confirming a validity of the communicated credentials;
    in response to receiving the response for each of the one or more selected ELD provider systems, accessing, by the one or more processing devices of the TDAP, ELD data logged by ELDs of the carrier from the one or more selected ELD provider systems.

2. The method of claim 1, wherein each ELD of the carrier communicates, to a respective one of the one or more selected ELD provider systems, respective logged ELD data.

3. The method of claim 1, wherein the ELD data comprises one or more of location data, velocity data, accelerometer data, times of operation, session reports, engine data, navigation system data, camera device data, sound data, or other data logged by ELD devices.

4. The method of claim 1, wherein the operations performed by the one or more processing devices of the TDAP further comprise, in response to receiving the response for each of the one or more selected ELD provider systems, generating a letter of authorization ("LOA") authorizing the TDAP to access the ELD data and share the ELD data with a client system requesting the ELD data.

5. The method of claim 4, wherein the operations performed by the one or more processing devices of the TDAP further comprise:
    receiving, from the client system, a request for ELD data of the carrier;
    displaying, via the computing device of the carrier, a request to approve sharing of the ELD data of the carrier;
    in response to receiving an input approving the sharing, displaying, via the computing device of the carrier, a set of ELD provider systems, wherein the received selection of the one or more ELD provider systems comprises a selection within the set of ELD provider systems.

6. The method of claim 4, wherein the operations performed by the one or more processing devices of the TDAP further comprise:
    receiving, from the computing device of the carrier, a request to revoke the LOA;
    in response to receiving the request to revoke the LOA, ceasing to access the ELD data.

7. The method of claim 4, wherein the operations performed by the one or more processing devices of the TDAP further comprise:
    receiving, from the computing device of the carrier, a request to revoke the LOA;
    in response to receiving the request to revoke the LOA, ceasing to share the ELD data with the client.

8. The method of claim 1, wherein the communicating the credentials to the ELD provider system comprises communicating, by the one or more processing devices of the TDAP, the credentials to an application programming interface ("API") of the ELD provider system.

9. The method of claim 8, wherein the credentials comprise an API key to enable communication with the API of the ELD provider system.

10. The method of claim 1, wherein the credentials comprise one or more of a username and a password.

11. The method of claim 1, wherein the displaying the request for credentials further comprises displaying ELD data types;
    wherein the receiving the input comprising the credentials further comprises receiving a selection of one or more ELD data types;
    wherein the communicating the credentials further comprises communicating a request for the selected one or more ELD data types;
    wherein the response confirming the validity of the communicated credentials further comprises a response confirming that the ELD provider system can share the selected one or more data types; and
    wherein the received ELD data comprises ELD data of the selected one or more data types.

12. The method of claim 1, wherein the operations performed by the one or more processing devices of the TDAP further comprise:
    displaying, via the computing device of the carrier, a set of one or more ELDs, wherein the selected one or more ELDs comprise a subset of the set.

13. The method of claim 12,
wherein the displaying the set of one or more ELDs comprises displaying a pre-selection of the subset of the set,
wherein the set corresponds to all ELD provider systems known to the TDAP,
wherein the pre-selected subset of the set corresponds to ELDs associated with an account of the carrier on the TDAP, and
wherein the receiving the selection of the subset comprises receiving a confirmation of the pre-selected subset.

14. A non-transitory computer-readable medium having instructions stored thereon, the instructions executable by a processing device of a transportation data aggregator platform ("TDAP") to perform operations comprising:
receiving, by the processing device of the TDAP from a transportation data aggregator platform ("TDAP") client system, a request for electronic logging device ("ELD") data of a carrier;
displaying, by the processing device of the TDAP, a request to approve sharing of the ELD data of the carrier;
receiving, by the processing device of the TDAP, a selection of one or more electronic logging device ("ELD") provider systems associated with ELDs of vehicles of the carrier;
for each of the one or more selected ELD provider systems:
displaying, by the processing device of the TDAP, a request for credentials associated with the selected ELD provider system;
receiving, by the processing device of the TDAP, an input comprising the credentials;
communicating, by the processing device of the TDAP to the ELD provider system, the credentials;
receiving, by the processing device of the TDAP from the ELD provider system, a response confirming a validity of the communicated credentials;
in response to receiving the response for each of the one or more selected ELD provider systems, accessing, by the processing device of the TDAP, ELD data logged by ELDs of the carrier computing device from the one or more selected ELD provider systems.

15. The non-transitory computer-readable medium of claim 14, the operations further comprising in response to receiving the response for each of the one or more selected ELD provider systems, generating a letter of authorization ("LOA") authorizing the TDAP to access the ELD data and share the ELD data with the TDAP client system.

16. The non-transitory computer-readable medium of claim 15, the operations further comprising:
receiving a request to revoke the LOA;
in response to receiving the request to revoke the LOA, ceasing, by the processing device of the TDAP:
(A) to access the ELD data; and
(B) to share the ELD data with the TDAP client system.

17. The non-transitory computer-readable medium of claim 14, wherein communicating the credentials to the ELD provider system comprises communicating, by the processing device of the TDAP, the credentials to an application programming interface ("API") of the ELD provider system.

18. A system, comprising:
one or more processors of a transportation data aggregator platform ("TDAP"); and
a non-transitory computer-readable storage medium comprising computer-executable instructions that, when executed by the one or more processors of the TDAP, cause the system to:
display, via a user interface, a set of one or more electronic logging device ("ELD") provider systems associated with ELDs of vehicles of a carrier and a request for a selection of one or more of the set for sharing of ELD data with a transportation data aggregator platform ("TDAP") client system;
receive, via the user interface, a selection of one or more of the displayed set of ELD provider systems;
for each of the one or more selected ELD provider systems:
display, via the user interface, a request for credentials associated with the selected ELD provider system;
receive, via the user interface, an input comprising the credentials;
communicate, to the ELD provider system, the credentials;
receive, from the ELD provider system, a response confirming a validity of the communicated credentials; and
in response to receiving the response for each of the one or more selected ELD provider systems, access ELD data logged by ELDs of the carrier from the one or more selected ELD provider systems; and
communicate the accessed ELD data to the TDAP client system.

19. The system of claim 18, wherein the non-transitory computer-readable storage medium further comprises computer-executable instructions that, when executed by the one or more processors of the TDAP, further cause the system to generate, in response to receiving the response for each of the one or more selected ELD provider systems, a letter of authorization ("LOA") authorizing (A) access of the ELD data from the selected one or more ELD provider systems and (B) communication of the ELD data to the TDAP client system.

20. The system of claim 18, wherein the non-transitory computer-readable storage medium further comprises computer-executable instructions that, when executed by the one or more processors of the TDAP, further cause the system to:
receive, via the user interface, a request to revoke the LOA; and
cease, in response to receiving the request to revoke the LOA:
(A) to access the ELD data from the selected one or more ELD provider systems and
(B) to communicate the ELD data to the TDAP client system.

21. The method of claim 1, wherein the one or more selected ELD provider systems includes a plurality of selected ELD provider systems.

22. The non-transitory computer-readable medium of claim 14, wherein the one or more selected ELD provider systems includes a plurality of selected ELD provider systems.

23. The system of claim 18, wherein the one or more selected ELD provider systems includes a plurality of selected ELD provider systems.

* * * * *